United States Patent [19]
Momochi et al.

[11] Patent Number: 5,189,627
[45] Date of Patent: Feb. 23, 1993

[54] ELLIPSE INTERPOLATION CONTROL METHOD BY AN NC-DEVICE

[75] Inventors: Takeshi Momochi; Tadashi Sasaki; Michio Matsumoto; Tomoo Hayashi; Masahito Shiozaki, all of Numazu, Japan

[73] Assignee: Toshiba Kikai Kabushiki Kaisha, Tokyo, Japan

[21] Appl. No.: 548,704

[22] Filed: Jul. 6, 1990

[51] Int. Cl.[5] .................. G06F 15/46; B23Q 17/22
[52] U.S. Cl. .................. 364/474.31; 364/474.28; 364/474.35; 318/573
[58] Field of Search .............. 364/474.28, 474.29, 364/474.31, 474.35, 474.02; 318/573

[56] References Cited
U.S. PATENT DOCUMENTS

| | | | |
|---|---|---|---|
| 3,766,369 | 10/1973 | Watanabe et al. | 364/474.31 |
| 4,031,369 | 6/1977 | Heaman et al. | 364/474.31 |
| 4,672,550 | 6/1987 | Winterbottom et al. | 364/474.25 |
| 4,945,487 | 7/1990 | Kimura et al. | 364/474.02 |
| 5,005,135 | 4/1991 | Morser et al. | 364/474.35 |

Primary Examiner—Jerry Smith
Assistant Examiner—Paul Gordon
Attorney, Agent, or Firm—Cushman, Darby & Cushman

[57] ABSTRACT

A complete-circle operation of a machine tool controlled by an NC-device. Even if the NC-device gives operation commands for respective shafts of the machine tool on the basis of a control locus which is to be a complete circle, the actual operation locus of the machine tool is not a complete circle because the machine tool generates errors due to various causes such as thermal deformation, machine accuracy, etc. If the errors are corrected individually to improve the accuracy, the complexity of the processing cannot be avoided. It is assumed that the operation locus of the machine tool which is controlled for a complete circle becomes an ellipse due to errors involved. A simple process corrects the ellipse such that it is converted to a complete circle.

9 Claims, 5 Drawing Sheets

ELLIPSE INTERPOLATION CONTROL METHOD BY AN NC-DEVICE

BACKGROUND OF THE INVENTION

1. Field of the Invention

The present invention relates to methods of controlling ellipse interpolation by a NC(Numerical Control)-device and more particularly to such methods used in NC-devices which control the operation of a tool machine which requires complete-circle accuracy.

2. Description of the Related Art

Conventionally, a machine tool which performs 3-dimensional cutting, etc., realizes a stereooperation by causing driving mechanisms disposed for the corresponding X, Y and Z shafts to move cooperatively. Programmed numerical control devices are often used for such a multi-shaft cooperative control.

Such an NC-device analyzes respective movement command values for the shafts from a predetermined movement command program input externally, and sequentially outputs the respective analyzed command values into driving mechanisms for the corresponding shafts of the machine tool to cause the respective driving mechanisms to cooperate and thereby to cause the machine tool to automatically execute a desired operation set in the program.

In order to cause the NC-device to perform an operation such as cutting a complete circle internally or externally, simultaneous control of at least two axes is required. For example, in order to cause the NC-device to draw a complete circle having a radius of r with the coordinates $(x_O, y_O)$ as the center in an X-Y plane, an X axis coordinates x and a Y axis coordinate y satisfy the equation: $(x-x_O)^2 = (y-y_O)^2 = r^2$ and the respective command values for the shafts are simultaneously controlled in accordance to an angle $\theta$ in the equation of $x = (r \cos \theta + x_O)$ and $y = (r \sin \theta + y_O)$.

Such a simultaneous control method of the two axes will involve an error and all the conventional control methods of a complete-circle operation can almost be said to be a control method of an ellipse operation. The error factors for causing such an ellipse operation involve the pitch between any adjacent shafts, a thermal deviation of each of the shafts, a thermal deviation of a main shaft head, a change in the machine tool body and aging of the control device and the machine tool body.

Basic measures are taken to increase the static accuracy and rigidity of each of the shafts. In order to cope with the thermal deviations, heat sources are suppressed or eliminated. In addition, a correction corresponding to each of the error factors is performed; e.g. a pitch error correction, a gradient correction, a thermal deviation correction and the like.

The measures against, or correction to, the error causing the ellipse are taken or performed for each of the factors in equation. Therefore, in order to increase the accuracy with which complete-circle-oriented machining is performed by a system comprising the NC-device and the machine tool, special techniques must be understood corresponding to the characteristic and control type of the machine tool itself. Therefore, it is very difficult or impossible for a general user to cope with these problems.

For example, in order to increase the static accuracy, a skill is required for measuring and adjusting the squareness of the angle between any adjacent shafts and the straightness of the respective shafts the above and special measuring instruments are required to execute. Therefore, measurements also, in order to suppress or eliminate the heat source, measurements must be taken against many heat sources, such as the main shaft head, ball screws and hydraulic units. Therefore, there are problems such as a complexity change of structure and an immense increase in the additional cost. In addition, these measurements have not perfectly eliminating these errors.

The correction of pitch errors is made for expansion and contraction of the respective shafts. The gradient correction is made for the squareness between adjacent shafts and the straightness of each of the shafts. However, such corrections are temporary and require a skilled person's technique and special measuring instruments. The correction of thermal deviations include correcting those deviations on the basis of the beforehand measured effects of heating due to various causes; this is effective. However, the correction to the thermal deviations is not effective for prevention of the generation of errors involved in the machine.

The mechanical accuracy of the control device and the machine tool occur due to aging. The correction in the control device is to set optimal values for the conditions under which the correction is made since there are no effective measures against aging.

SUMMARY OF THE INVENTION

It is an object of the present invention to provide a method of controlling ellipse interpolation by an NC-device which is capable of easily and accurately increasing the roundness of the cut and dealing with various ellipse error factors, including aging.

The present invention makes a correction on the basis of a result of a complete-circle-oriented operation of a machine tool controlled by an NC-device. It makes a general roundness correction by regarding as an ellipse the whole configuration of the locus of operation of the machine tool and correcting a control locus in the NC-device on the basis of data representing the configuration of the ellipse.

For example, the locus of an ellipse having a major radius of "ar" in the X-axis direction and a minor radius of "br" in the Y-axis direction with the coordinate $(x_O, Y_O)$ as the center is given by $$\frac{(x - x_0)^2}{(ar)^2} + \frac{(y - y_0)^2}{(br)^2} = 1$$

The coordinate of a point P' (x, y) on the periphery of the ellipse is given by $$x = (ar \cos \theta + x_O)$$

$$y = (br \sin \theta + y_O)$$

where $\theta$ designates the angle between the X axis and a straight line connecting the center of the ellipse and the point P'.

The locus of a complete-circle having a radius of r and the same center is given by $$(x - x_O)^2 + (y - y_O)^2 = r^2$$

where a point P (x, y) on the periphery of that circle is given by $$x = (r \cos \theta + x_O)$$

$$y = (r \sin \theta - y_O)$$

Therefore, conversion between the point P' on the ellipse and the point P on the complete circle is calculated by the difference in spacing between the coordinates of the points P' and P, and correction is required each time such difference is calculated, while correction using coefficients "a" and "b" which define the configuration of an ellipse is easily and automatically made.

On the basis of such recognition, an ellipse interpolation control method by an NC-device according to the present invention includes obtaining data on the configuration of an ellipse from the locus of complete-circle-oriented operation of the machine tool controlled by the NC-device, and correcting the control occurs in the NC-device converting the configuration of the ellipse defined by the ellipse configuration data to a complete circle.

Data on the configuration of the ellipse can make use of values, by which a predetermined ellipse configuration is determined as a whole pattern, such as an aspect ratio defining the configuration of the ellipse or the difference between the major and minor axes in addition to the coefficient "a" and "b" of the major and minor radii as mentioned above. Data on the configuration of the ellipse may include a tilt of the major or minor axis to a reference and a radius ratio for complete-circle-oriented correction.

These pieces of data on the ellipse configuration may be determined by appropriately analyzing the actual locus of complete-circle-oriented operation of the machine tool controlled by an NC-device used. A method may be used which includes, for example, performing a testing operation before performing complete-circle machining, measuring the locus of operation of the machine tool using a circular test (a synthetic accuracy measuring device for an NC machine tool) and determining the degree of ellipticity.

Processing according to the inventive method such as analysis or complete-circle correction on the data on the configuration of an ellipse may be performed by any appropriate processing means provided in the NC-device. It is desirable to automatically execute a series of processing operations collectively using the NC-device in such a manner that data on the locus of operation obtained by the circular test is directly input to the NC-device.

Correction to the NC-device is made on the basis of the actual operation of the machine tool controlled by the NC-device. Therefore, various errors involved in the respective stages of the system including the NC-device to the machine tool are eliminated generally.

In the roundness correction in the NC-device, the locus of operation of the machine tool is understood as an entire configuration and the control locus in the NC-device is corrected on the basis of the configuration of the ellipse. Therefore, it is possible to collectively extract the effects of various errors, appearing sequentially in one cycle of the locus of the operation, as the features of the ellipse configuration, so that it is possible to compensate for the effects of the various errors synthetically.

Since the control locus Lo is corrected when required on the basis of the operation locus Lr measured before the actual machining, errors due to aging up to the present point of time are corrected similarly. Aging due to thermal deformation is coped with by remeasuring the operation locus or by resetting correction coefficients Cx and Cy during the operation when required.

Therefore, in the present invention, errors appearing in the respective stages of the control system and the respective points of time in an operation cycle are compensated synthetically, the needs for a detailed study on the respective errors and for complicated measurements for the respective error factors including aging are eliminated and improvement to he roundness accuracy is performed easily and accurately. Thus the above object of the present invention is achieved.

DETAILED DESCRIPTION OF THE PREFERRED EMBODIMENT

One embodiment of the present invention will be described hereinafter with reference to the drawings.

Figure 1:
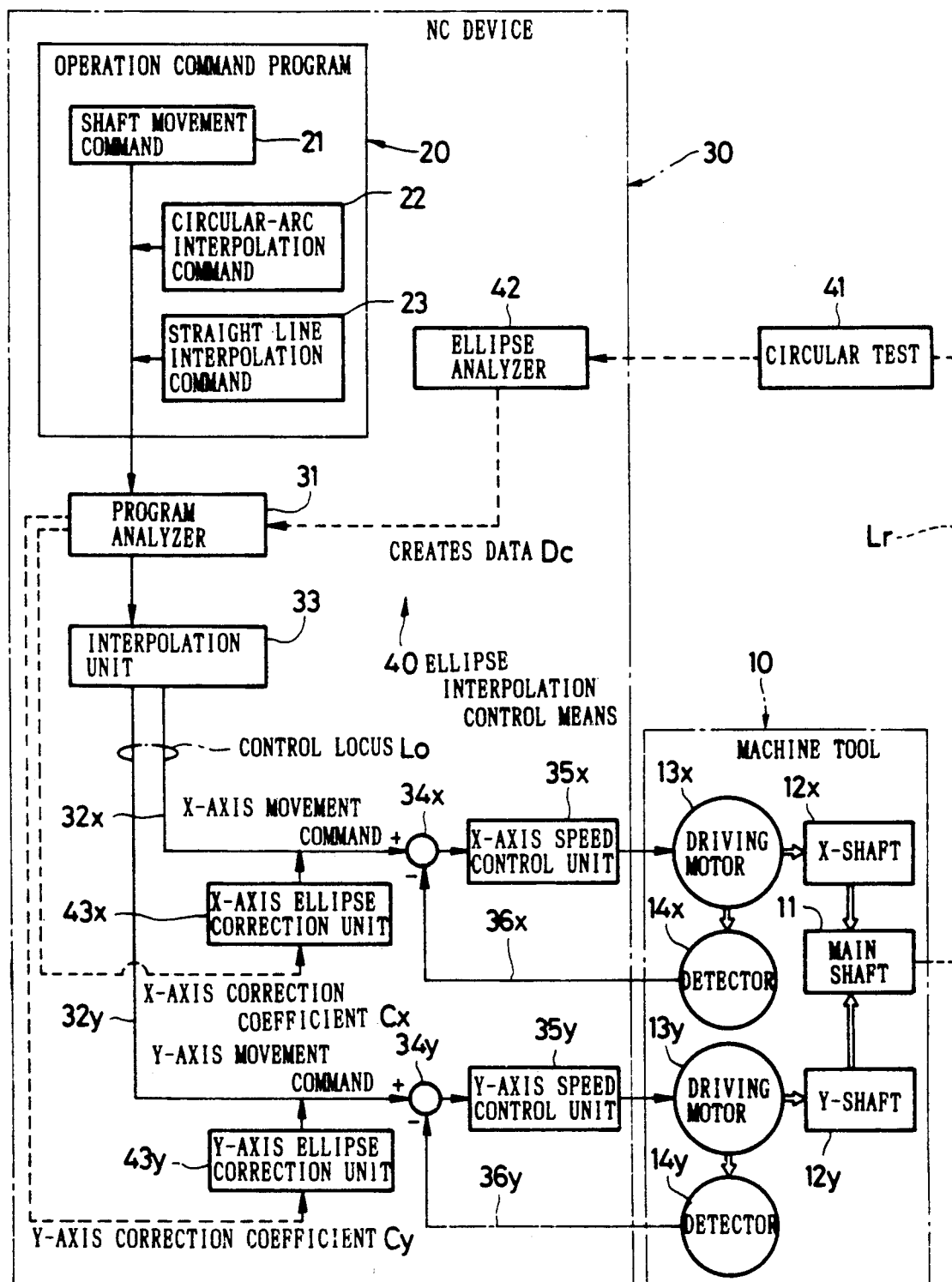
FIG. 1 is a block diagram of one embodiment of the present invention.

In FIG. 1, an NC-device 30 of the present embodiment provides a control on the basis of a set operation command program 20 to thereby cause a machine tool 10 to execute a 2-dimensional machining operation including complete-circle cutting.

The machine tool 10 includes an X-shaft 12X and a Y-shaft 12Y disposed in a crossed manner and being of e.g., a ball screw shaft in order to move a main shaft 11 for cutting in a 2-dimensional plane. Shafts 12X and 12Y are connected to driving motors 13X and 13Y and movement quantity detectors 14X and 14Y, respectively.

The operation command program 20 mainly includes a shaft movement command 21 instructing the movement of the main shaft 11 of the machine tool 10 and additionally includes a circular-arc interpolation command 22 and a straight-line interpolation command 23.

The NC-device 30 includes a program analyzer 31 which analyzes the program 20 and an interpolation unit 33 which calculates movement commands 32X and 32Y for the X- and Y- shafts on the basis of the result of the analysis by the program analyzer 31. For an arc movement and a tilted linear movement requiring the cooperative movement of the X- and Y-shafts, the interpolation unit 33 refers to the arc interpolation command 22 and the straight-line interpolation command 23 and performs an interpolating operation to optimize a control locus Lo drawn by the movement commands 32X and 32Y in the X-Y plane.

The NC-device 30 outputs movement commands 32X and 32Y to motors 13X and 13Y of the machine tool 10 through differential devices 34X and 34Y and speed control units 35X and 35Y and ensures the follow-up of the respective X-, Y-shafts 12X and 12Y to the movement commands 32X and 32Y through feedback loops 36X and 36Y through which the outputs of the detectors 14X and 14Y are fed back to the differential devices 34X and 34Y.

The NC-device 30 of the present embodiment includes an ellipse interpolation control means 40 for performing an ellipse interpolation when a complete-circle movement is made.

The ellipse interpolation control means 40 includes a circular test 41 connected externally to the NC-device 30 for measuring the operation locus Lr of the machine tool 10, an ellipse analyzer 42 which creates data Dc on the ellipse configuration from the results of the measurement by the circular test 41, and ellipse correction units 43X and 43Y which correct movement commands 32X and 32Y on the basis of correction coefficients Cx and Cy which are given by the program analyzer 31 on the basis of the outputs from the ellipse analyzer 42.

Figure 2:
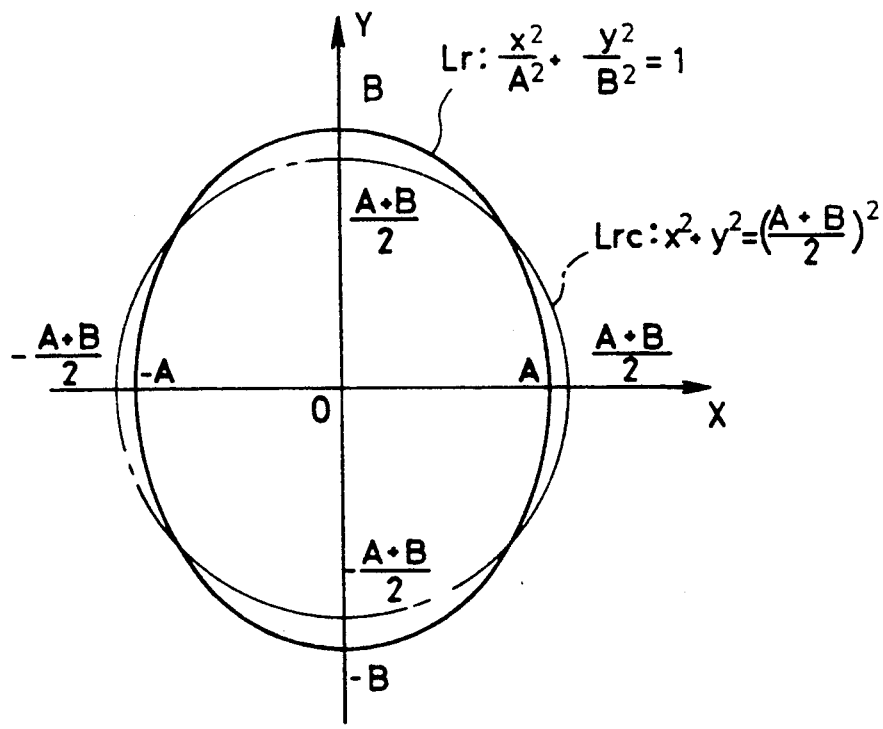
FIG. 2 is a graph of the corrected state of the operation locus of the embodiment.

The circular test 41 measures the actual locus of the main shaft 11 when the machine tool 10 is operated by the NC-device 30. In the preferred embodiment, it measures the operation locus Lr (see FIG. 2) in one cycle when the main shaft 11 is moved along the periphery of a complete circle in accordance with movement commands 32X, Y which give a control locus Lo (see FIG. 3) form the NC-device 30, and automatically inputs the results of the measurement to the ellipse analyzer 42.

The analyzer 42 regards the input operation locus Lr as an ellipse, recognizes the maximum and minimum radii of the ellipse and determines data on the ellipse configuration Dc by using the maximum and minimum radii as the major and minor axes. In the particular embodiment, the minor and major radii A and B in the X- and Y-axis directions, respectively, are recognized from the operation locus shown in FIG. 2 and given by $$Lr: \frac{X^2}{A^2} + \frac{Y^2}{B^2} = 1$$

The following correction coefficients for the X- and Y-axes are set so as to bring about a complete circle Lrc having a radius of an intermediate value of $(A+B)/2$:

$$Cx = \frac{A+B}{2A}, Cy = \frac{A+B}{2B}$$

and these coefficients are output through the program analyzer 31 to the ellipse correction units 43X and 43Y.

Figure 3:
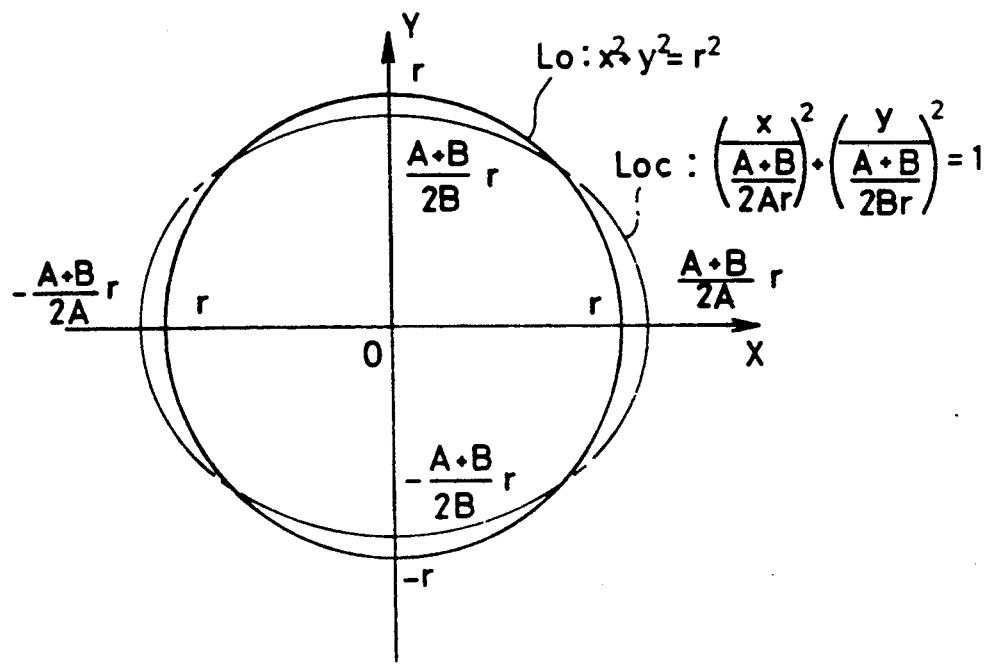
FIG. 3 is a graph of the corrected state of a control locus for the embodiment.

The ellipse correction units 43X, Y correct the movement commands 32X and 32Y with the given correction coefficients Cx, Cy and convert the control locus Lo given tot he respective feedback loops 36X and 36Y to the corrected control locus of FIG. 3 given by $$Loc: \left[\frac{2AX}{(A+B)r}\right]^2 + \left[\frac{2BY}{(A+B)r}\right]^2 = 1$$

for ellipse interpolation.

At this time, the program analyzer 31 sets the correction coefficients Cx, Cy from the ellipse analyzer 42 in the ellipse correction units 43X and 43Y only when the operation based on the program 20 is a movement along the periphery of a complete circle; the program analyzer otherwise, nullifies the action of the ellipse correction units 43X and 43Y on the movement commands 32X and 32Y for example, by setting the ellipse correction units 43X and 43Y such that correct movement commands 32X and 32Y are delivered intact to the differential devices 34X and 34Y.

Those elements constitute the ellipse interpolation control means 40 which performs an ellipse interpolation when the complete-circle-oriented operation of the machine tool 10 is controlled by the NC-device 30.

In the present embodiment, thus constructed, the machine tool 10 performs a machining operation including a complete circle movement under the control of the NC-device 30.

Figure 4:
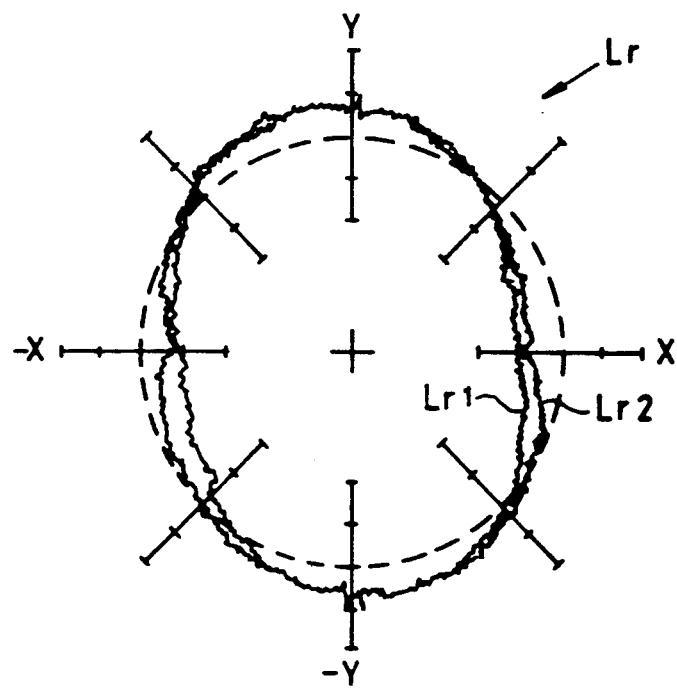
FIG. 4 is a graph of the operation locus of the embodiment before correction.

In order to perform ellipse interpolation for complete circle movement, the NC-device 30 executes the program 20 which commands a complete-circle movement before the actual machining is done and the circular test 41 measures the operation loci Lr of the machine tool 10 in accordance with the control locus Lo. FIG. 4 shows the measurement of two operations loci $Lr_1$ and $Lr_2$.

Subsequently, the ellipse analyzer 42 analyzes the measured operation locus Lr, and recognizes that, in the locus Lr represented by the ellipse data Dc, the major axis extends in the Y-axis direction while the minor axis extends in the X-axis direction with the minor and major radii being A and B, respectively. The following correction coefficients for the X and Y axes obtained from the minor and major radii A and B and given by $$Cx = \frac{A+B}{2A}, Cy = \frac{A+B}{2B}$$

are set in the ellipse correction units 43X and 43Y, so that the control occurs Lo in the NC-device 30 is corrected to a control locus Loc.

Figure 5:
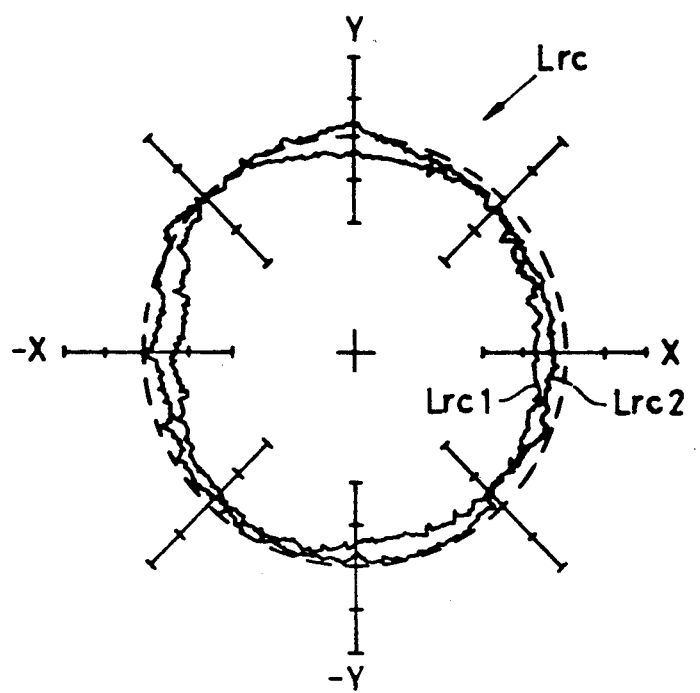
FIG. 5 is a graph of the operation locus of the embodiment after correction.

As the result of such correction, the operation locus Lrc of the machine tool 10 depending on the control locus Loc is changed substantially to a complete circle as shown by the operation loci $Lrc_1$ and $Lrc_2$ in FIG. 5 and ellipse interpolation is thereby performed. Therefore, in the actual machining, the roundness of an article is improved by performing such ellipse interpolation when complete-circle movement is made.

According to the present embodiment, the following results are achieved.

Since roundness correction is made to the control locus Lo on the basis of the actual operation locus Lr of the machine tool 10 controlled by the NC-device 30, all the possible errors occurring in the respective stages of the system including the NC-device 30 to the machine tool 10 are compensated collectively.

The effects of various errors appearing sequentially in one cycle of the operation locus Lr are compensated by analyzing as an entire configuration the operation locus Lr of the machine tool 10, setting correction coefficients Cx, Cy to give the operation locus Lro of a complete circle on the basis of the obtained data Dc on the ellipse configuration such as the minor and major radii A and B, and outputting the control locus Loc corrected by the correction coefficients Cx, Cy.

Since the control locus Lo using the operation locus Lr measured before the actual machining is corrected each time the measurement is made, errors due to aging are corrected simultaneously. In addition, aging due to thermal deformation is also coped with by remeasuring the operation locus or by resetting the correction coefficients Cx and Cy during machining when required.

Therefore, according to the preferred embodiment, errors appearing at the respective stages of the control system comprising the NC-device 30 to the machine tool 10 and at the respective points of time in a complete-circle operation cycle of the machine tool 10 are compensated for automatically, and the need for a detailed study of the individual errors and the need for troublesome measures against each of the error factors are eliminated and the roundness accuracy is improved easily and accurately.

Figure 6:
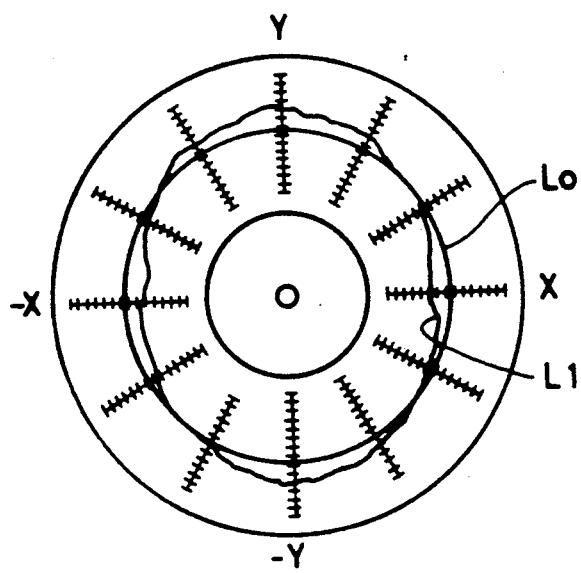
FIG. 6 is a graph of the results of the operation of a control example in which no correction such as that by the embodiment is made.
Figure 7:
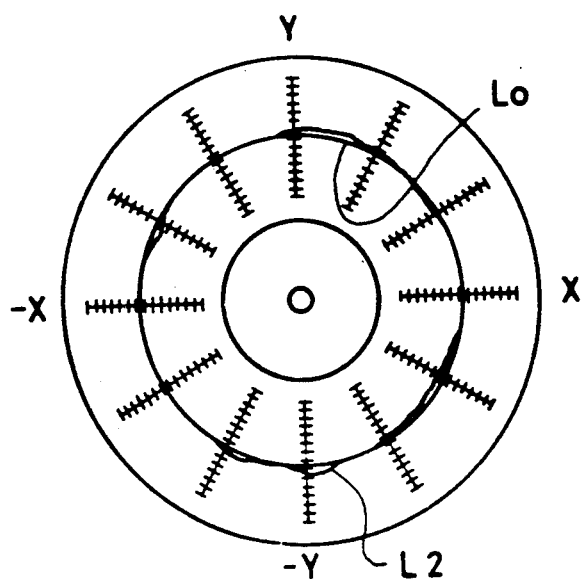
FIG. 7 is a graph of the results of the operation of the embodiment after correction.

An article was subjected to complete-circle cutting by a control example similar to the present embodiment and comprising an NC-device 30 to a machine tool 10 without ellipse interpolation control means 40 and the obtained cut configuration of the article was measured by a roundness measuring device. The locus of an ellipse configuration Lt obtained differs from a control locus Lo of a complete circle, as shown in FIG. 6. In contrast, an article was subjected to complete-circle cutting by the present embodiment which comprises the NC-device 30, the machine tool 10 and the ellipse interpolation control means 40 and the obtained cutting configuration was measured similarly. At this time, a locus L2 very similar to the control Locus Lo, as shown in FIG. 7, was obtained, which teaches that ellipse interpolation by the present embodiment is effective for improvement to the roundness accuracy.

In the preferred embodiment, since the ellipse interpolation control means 40 which performs an ellipse interpolating operation includes the circular test 41 connected externally with he NC-device 30, and the ellipse analyzer 42 and the ellipse correction units 43X and 43Y disposed in the NC-device 30, it has a simplified structure and is easily applicable to the existing NC-devices.

Since the ellipse analyzer 42 uses the minor and major radii A and B as ellipse configuration data Dc, the major and minor radiuses may be measured from the operation locus Lr measured by the circular test 41, which simplifies the processing.

When the control locus Lo is corrected based on the ellipse configuration data Dc, the ellipse correction units 43X and 43Y manipulate movement commands 32X and 32Y, which is the correction performed immediately before the feedback loops 36X and 36Y of the output stage, so that the effect is ensured.

Whether the correction by the ellipse correction units 43X and 43Y is to be effective or not is determined by the program analyzer 31, depending on the contents of the machine tool operation, and useless correction is not performed other than the complete-circle movement, so that a circular arc movement or straight-line movement other than complete circle movement is not influenced and an operation similar to the regular operation of the NC-device 30 is ensured.

Therefore, arc interpolation or straight-line interpolation performed by the interpolation unit 33 on the proper movement commands 32X and 32Y outputted to the machine tool 10 by the speed control units 35X and 35Y is used effectively.

The present invention is not restricted to the above embodiment and includes the following modifications.

Ellipse configuration data Dc are required to be those which can determine a predetermined ellipse configuration as an entire pattern: namely, coefficients for the major and minor radii of the operation locus Lr such as $a=A/r$, $b=B/r$ where r is the radius of the control locus Lc, the major/minor axis ratio A/B, the difference between the major and minor axes A–B, in addition to the minor and major radii A and B of the operation locus Lr.

The major or minor axis of the operation locus Lr does not necessarily coincide with the X or Y axis. The respective tilts of the shafts are required to be measured in the analysis of the ellipse configuration so as to be referred to when the correction coefficients Cx, Cy are calculated or when the ellipse correction is made using these correction coefficients.

When the minor and major radii A and B vary relative to the radius r of the control locus Lo due to, for example, an uneven configuration of the operation locus, the radius $(A=B)/2$ of the operation locus Lrc obtained by ellipse interpolation may not coincide with the proper radius r in which case the control locus Lo may be corrected or adjusted with a ratio $(A=B)/2r$ against the radius.

The means for measuring the operation locus Lr of the machine tool 10 when the ellipse configuration data Dc is determined may be a measuring device other than the circular test 41. In summary, it may be a measuring device which can measure the operation locus Lr which recognizes a degree of elliptisty.

At this time, while the obtained data on the operation locus Lr may be input to the NC-device 30 through artificial manipulation, the processing based on the present invention is automatically executed collectively by the NC-device 30, workability is improved and the occurrence of errors due to mistaken inputting is prevented by directly inputting automatically the obtained data on the operation locus Lr as in the preferred embodiment.

The specific structure of the ellipse interpolation control means 40 provided in the NC-device 30 is not limited to the one including the ellipse analyzer 42 and the ellipse correcting units 43X and 43Y of the preferred embodiment. The disposition of the ellipse correcting units 43X and 43Y which correct the control locus Lr, the values, attributes, etc., of the correction coefficients Cx and Cy may be changed appropriately when machining is made.

For example, the respective axial corrections are not limited to the addition and subtraction of the differential and may be multiplied using scaling ratios for the radius. For example, the respective axial scaling ratios may be set as follows:

$$xp = \frac{A + U}{A}, yp = \frac{B + V}{B}$$

where U is a correction quantity for the X axis and V is a correction quantity for the Y axis. These scaling ratios may be multiplied by the axial components of the movement commands issued at the respective points of time for correcting purposes.

The calculating process in the ellipse analyzer 42 may be changed appropriately in accordance with ellipse configuration data Dc used or in accordance with a given operation. For example, since overcutting cannot be restored, the control locus may be set slightly larger than a desired one in outer-periphery cutting for a cylinder or the like while it may be set slightly smaller than a desire done in inner-periphery cutting such as boring.

Figure 8:
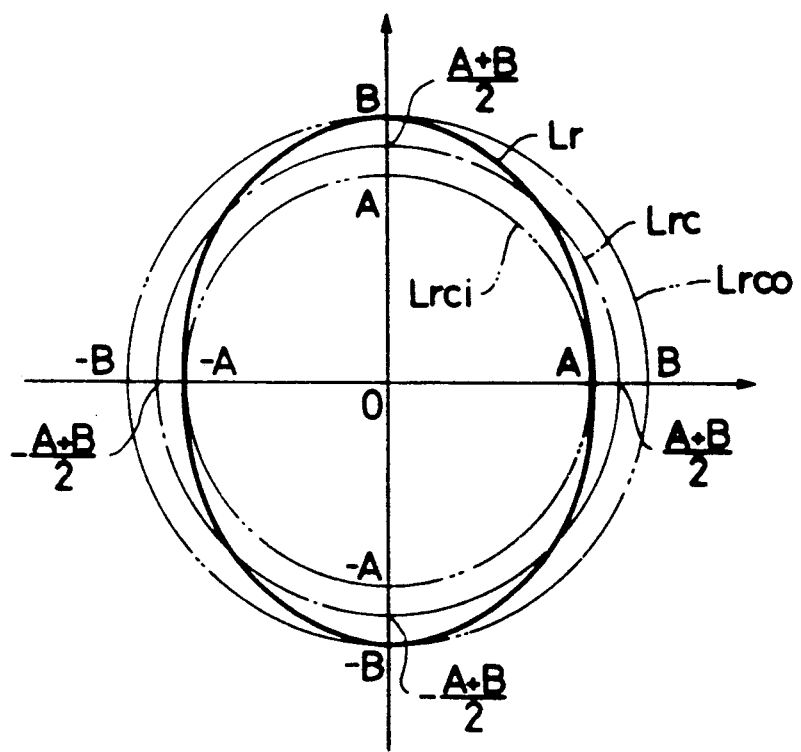
FIG. 8 is a graph of a modification of correction by the embodiment.

As shown in FIG. 8, if the operation locus Lr is an ellipse having a minor radius A extending in the X axis direction and a major radius B extending in the Y axis direction, the corrected operation locus Lrc may be a complete circle having a radius of (A+B)/2 which is the intermediate value of the respective radii as in the preferred embodiment. In inner-periphery cutting, a complete circle Lrci having a radius which is equal to a minor radius A may be used, while in outer-periphery cutting a complete circle Lrco having a radius equal to the major radius B may be used.

As described above, the practical correction contents may be selected optionally when required. In summary, arrangement is required such that correction for conversion of an elliptical operation locus Lr to a complete-circle operation locus Lrc is made to the control locus Lr so as to output a control locus Loc used actually for control.

As described above, according to the inventive ellipse interpolation control method by an NC-device, the roundness accuracy is improved easily and accurately and various error factors including aging are corrected.

What is claimed is:

1. An ellipse interpolation control method using an NC-device comprising:
    a program analyzer for determining a predetermined control locus from a given operation command program;
    an interpolation unit for determining movement command values for a plurality of shafts of a machine tool on the basis of the predetermined control locus;
    a feedback loop for controlling respective driving mechanisms for the shafts of the machine tool in accordance with the corresponding movement command values for the shafts thereby causing the machine tool to perform a multi dimensional operation utilizing the respective shafts, the method comprising the steps of:
    causing the NC-device to control the machine tool using the predetermined control locus of a complete circle while measuring an operation locus of the machine tool using a measuring device connected externally to the NC-device;
    delivering the measured data on the operation locus to the NC-device;
    analyzing ellipse configuration data from the operation locus, wherein the ellipse configuration data includes data indicative of a major and a minor axis of the operation locus;
    determining respective correction coefficients for the shafts to convert an ellipse configuration defined by the ellipse configuration data in the program analyzer to a complete circle; and
    correcting the movement command values for the shafts corresponding to the correction coefficients.

2. An ellipse interpolation control method using an NC-device, comprising the steps of:
    obtaining ellipse configuration data from an operation locus of a machine tool, the machine tool being controlled on the basis of a control locus of a complete circle in the NC-device, wherein the ellipse configuration data are values defining a desired ellipse configuration as an entire pattern and the values are represented by a minor and major radii of the operation locus, the minor radius corresponding to a radius lying on the X or Y axis which is smaller than he major radius lying on the other axis; and
    correcting the control locus such that the machine tool has an operation locus of a complete circle on the basis of the ellipse configuration data.

3. An ellipse interpolation control method according to claim 2, wherein the ellipse configuration data includes data indicative of a tilt of the major or minor axis to a predetermined direction.

4. An ellipse interpolation control method according to claim 2, wherein the steps of obtaining ellipse configuration data and of correcting the control locus are performed automatically in the NC-device.

5. An ellipse interpolation control method using an NC-device, comprising the steps of:
    obtaining ellipse configuration data from an operation locus of a machine tool, the machine tool being controlled on the basis of a control locus of a complete circle in the NC-device; and
    correcting the control locus such that the machine tool has an operation locus of a complete circle on the basis of the ellipse configuration data, wherein a correction of a movement command value for each shaft in the machine tool is based upon correction coefficients and is performed immediately before a control feedback loop from the machine tool enters the NC-device.

6. An ellipse interpolation control method using an NC-device, comprising the steps of:
    obtaining ellipse configuration data from an operation locus of a machine tool ,the machine tool being controlled on the basis of a control locus of a complete circle in the NC-device, wherein the ellipse configuration data are values defining a desired ellipse configuration as an entire pattern and includes data indicative of the ratio of radius between a circle which has been subjected to complete-circle correction nd the circle of the control locus before the correction; and
    correcting the control locus such that the machine tool has an operation locus of a complete circle on the basis of the ellipse configuration data.

7. An ellipse interpolation control method using an NC-device causing driving mechanisms for respective shafts in a machine tool to cooperatively move and hence perform a multidimensional operation in accordance with respective movement command values for the shafts on the basis of a predetermined control locus, comprising the steps of:
    causing the NC-device to control the machine tool using the predetermined control locus of a complete circle while obtaining ellipse configuration data from an operation locus of the machine tool;
    analyzing correction coefficients of the respective shafts to convert an ellipse configuration defined by the ellipse configuration data to a complete circle; and
    correcting the respective movement command values for the respective shafts based upon the corresponding correction coefficient.

8. An ellipse interpolation control method according to claim 7, wherein the correction to the movement command value for each shaft based upon the correction coefficients is performed immediately before respective shaft control feedback loops from the machine tool enter the NC-device.

9. An ellipse interpolation control method according to claim 7, wherein the steps of obtaining ellipse configuration data and of correcting the respective movement command values are performed automatically in the NC-device.

* * * * *